United States Patent [19]

Jones et al.

[11] Patent Number: 5,680,538
[45] Date of Patent: Oct. 21, 1997

[54] SYSTEM AND METHOD FOR MAINTAINING A MINIMUM QUALITY OF SERVICE DURING READ OPERATIONS ON DISK ARRAYS

[75] Inventors: Craig Jones, Lago Vista; Tony Patterson, Austin, both of Tex.

[73] Assignee: Dell USA, L.P., Round Rock, Tex.

[21] Appl. No.: 513,644

[22] Filed: Aug. 10, 1995

[51] Int. Cl.$^6$ ................................................ G06F 11/34
[52] U.S. Cl. .................................. 395/182.03; 395/427
[58] Field of Search .............................. 395/180, 182.03, 395/182.04, 182.05, 438, 439, 441; 371/7, 8.1, 51.1, 40.1, 40.5

[56] References Cited

U.S. PATENT DOCUMENTS

| | | | |
|---|---|---|---|
| 5,283,791 | 2/1994 | Halford | 371/40.1 |
| 5,331,646 | 7/1994 | Krueger et al. | 371/40.1 |
| 5,345,565 | 9/1994 | Jibbe et al. | 371/49.2 |
| 5,463,643 | 10/1995 | Gaskins et al. | 371/40.1 |
| 5,526,507 | 6/1996 | Hill | 395/441 |
| 5,544,339 | 8/1996 | Baba | 395/441 |

Primary Examiner—Robert W. Beausoliel, Jr.
Assistant Examiner—Albert Décady
Attorney, Agent, or Firm—Skjerven, Morrill, MacPherson, Franklin & Friel L.L.P.; Stephen A. Terrile

[57] ABSTRACT

A disk array system and method which maintains a minimum data delivery requirement or minimum quality of service during varying conditions. The present invention utilizes the alternate data paths available to maintain minimum data delivery requirements under varying types of conditions, including both normal and degraded conditions as well as transitions between these conditions. According to the present invention, the disk controller receives a data read request from the host and issues a plurality of read requests for the data using a plurality of different data paths. These read requests operate in parallel to retrieve the desired data from the drives using the different data paths. Thus, if one or more of the requests fails, the other requests being performed contemporaneously will soon complete or will have completed returning the correct data. This guarantees that the correct data is returned even in instances where one or more of the data paths returns incorrect data. This also provides that data recovery operations can be performed much more efficiently since the correct data returned from one of the data paths is readily available for data recovery operations.

17 Claims, 6 Drawing Sheets

SYSTEM AND METHOD FOR MAINTAINING A MINIMUM QUALITY OF SERVICE DURING READ OPERATIONS ON DISK ARRAYS

FIELD OF THE INVENTION

The present invention relates to disk array storage systems, and more particularly to a system and method for maintaining a minimum rate of data delivery from a disk array system during normal and degraded conditions as well as transitions between these conditions.

DESCRIPTION OF THE RELATED ART

Modern computer systems require increasingly greater amounts of memory and storage capabilities. This is particularly true in network server applications where a single computer referred to as a file server stores files for a number of users in a local area network (LAN). In a typical file server, the storage needs typically exceed the capacity of current hard disks, and thus most file servers require multiple disks to provide the necessary storage capacity. A typical disk drive storage configuration uses a redundant array of inexpensive disks, referred to as a RAID configuration, whereby the drives are linked together through hardware and software to form a drive array. In this manner, a number of individual hard disks are combined to create a massive virtual system. The drives in the array are coordinated with each other and information is allocated between them.

In a typical RAID configuration data is split between the drives at the bit, byte or block level. For example, in a four drive system two bits of every byte might come from the first hard disk, the next two bits from the second hard disk, and so on. The four drives, operating in parallel, then output a single byte data stream four times faster than a serial drive implementation, i.e., transferring all the information comprised in a byte takes only as long as required for a single drive to transfer two bits. This technique of splitting data between several drives is referred to as data striping. Operating multiple individual disks together as an array allows for higher speeds, improved reliability, and greater resistance to errors than can be achieved by operating each disk independently.

One possible drawback to data striping is that the failure of any drive in the system results in the complete failure of the entire system. Therefore, various methods have been developed to use a portion of the capacity of the drive array to yield more reliable and fault-tolerant storage systems. This increased reliability and fault-tolerance is achieved through various redundancy measures, including mirroring and parity implementations. Currently, five levels of RAID technology are now recognized. Each of these implementations has various tradeoffs regarding efficient use of drive capacity, fewest number of drives, greatest reliability, and best performance.

RAID 1 is the simplest drive array implementation and comprises two equal capacity disks that mirror each other. One disk duplicates all the files of the other, essentially serving as a backup copy. RAID 2 interleaves bits or bytes of data, i.e., implements data striping as explained above, and uses one or more redundant disks to correct single bit errors and detect double bit errors. The number of extra disks required depends upon the particular error correction algorithm used. RAID 3 implements data striping and includes one or more extra drives for parity checking. It is important to note that RAID 3 only provides for parity checking and does not include any provision for error correction, i.e., errors can be detected without any guarantee of recovery. Parity checking typically requires fewer extra drives than the other RAID implementations, typically only one extra drive per array. RAID 4 interleaves sectors of data, not bits or bytes. In addition, the sectors are read serially as if the drives in the array were functionally one large drive with more heads and platters. One drive in the array is dedicated to parity checking for reliability. The RAID 4 implementation offers the advantage that operating systems can process multiple data requests simultaneously and further can receive and reorganize requests to perform them in the most efficient manner. In the RAID 5 implementation, the disk array does not include a single dedicated parity drive as in RAID 4, but rather the parity check function is rotated throughout the various drives in the array. In this manner, error checking is distributed across all of the disks in the array. RAID 4 can be considered a degenerate form of RAID 5, i.e., once disk array controller logic has been developed to implement a RAID 5 array, a RAID 4 array can be implemented by simply disabling the logic which distributes parity across the disks in the array. In addition to the five levels of RAID technology discussed above, the term "RAID 0" is often used to refer to a number of disk drives that are data striped but have no form of redundancy. Further, a disk array which uses a row-column parity configuration is referred to as a RAID 6 configuration RAID disk subsystems are used in environments where performance and data availability are critical. Data redundancy is used to provide high data availability and prevent one disk failure from incapacitating the entire array. When erroneous data is returned from a drive in response to a read request, there is typically sufficient redundancy to determine the error and reconstruct the correct data. In many drive array systems, an intelligent controller attempts to fix the error, i.e., reads or reconstructs the correct data, writes the correct data on to the erroneous drive and then reads the data to verify that the correct data is stored on the drive. If the drive repeats the error, then a drive failure is indicated. In this instance, the drive controller will reconstruct the lost data as necessary until a replacement drive is installed. In other words, during the time between the failure of a drive and its replacement with a new drive, the data on the failed drive is automatically generated using the other drives and the redundancy drive, and thus the drive array behaves as if the drive failure has not occurred. When the replacement drive is installed, the "lost" data is reconstructed onto the replacement drive using the data from the remaining drives and the redundancy data.

In redundant storage systems such as RAID disk arrays, there are a minimum of two independent ways to read any block of data from the storage system. In other words, there are generally two or more independent data paths from which data may be obtained from the drives. The main data path used to obtain data from the drives is referred to as the primary data path, and the other paths can be referred to as alternate data paths. The disk array controller can be designed to 1) use only the primary data path to read the desired data and use the alternate path(s) strictly as backup, or 2) load balance the read requests across the data paths to deliver read performance significantly better than that of a non-redundant configuration. This latter technique generally includes issuing two or more requests, wherein each request uses a different data path and obtains different data. In RAID systems designed for independent, command-queued access, the latter technique can be done for RAID 1 configurations, but is generally not done for RAID 4/5 configurations. In RAID systems designed for serial, sequential access, the latter technique can be applied to RAID 3/4 configurations. For more information on load balancing read requests in RAID 3/4 configurations, please see related co-pending patent application Ser. No. 08/500,760 titled "Disk Array System Which Performs Data Reconstruction with Dynamic Load Balancing to Maintain Predictable Degradation" and filed Jul. 11, 1995.

In many RAID disk array systems, the disk array controller is designed to take advantage of the alternate data paths available to improve I/O throughput as described above. However, certain applications such as video or multimedia applications place real-time data delivery requirements on retrieval of information from the disk array. These applications require a minimum rate of delivery to fulfill data delivery requirements, and these systems generally cannot use the additional I/O performance gained from using alternate data paths. The minimum rate of data delivery is referred to as quality of service, and a disk storage system designed to deliver a minimum quality of service must be designed to achieve this minimum data rate not only during normal conditions, but also during degraded conditions and the transition between these conditions.

The above technique of using various alternate data paths to improve I/O throughput is incompatible with real-time applications such as video servers because the throughput of the system drops considerably when a disk failure occurs. For example, if the disk controller issues two or more requests on different data paths to obtain different sets of data, and one of the requests fails, the disk controller is required to reissue the failing request on a different path when the failure is determined. Thus, a disk failure may cause the throughput of the system to drop below the minimum desired quality of service.

Therefore, a disk array system and method is desired which provides a minimum quality of service or minimum data delivery rate during all conditions, including degraded conditions where a drive failure has occurred as well as transitions between normal and degraded conditions.

SUMMARY OF THE INVENTION

The present invention comprises a disk array system and method which maintains a minimum data delivery requirement or minimum quality of service during varying conditions. As discussed above, certain applications such as video or multimedia applications place full time data delivery requirements on retrieval of information from the disk subsystem. The present invention utilizes the alternate data paths available to maintain minimum data delivery requirements under varying conditions, including both normal and degraded conditions as well as the transition between these conditions.

According to the present invention, the disk controller receives a data read request from the host and issues a plurality of read requests on the drives using a plurality of different data paths. These read requests are each designed to retrieve the same data and operate in parallel to retrieve the desired data from the drives using the different data paths. When the first request completes, the disk controller determines if the data returned is in error. If the first request completes successfully, then the disk controller transfers the data to the host CPU and completes the host I/O transfer. The disk controller also maintains the correct data in its internal data buffers in case other requests using other data paths return incorrect data and recovery operations are necessary.

When all subsequent requests have completed successfully and a prior request has already completed successfully, the disk controller 122 performs normal clean-up operations for the requests and operation completes. If a request has completed successfully and a subsequent request returns incorrect data, then recovery operations are performed using the correct data obtained from the first request. In this instance, since the correct data is maintained in the disk controller's internal data buffers until all requests have completed, the correct data is readily available to perform recovery operations much more quickly. This helps to maintain a minimum quality of service in instances where one of the data paths returns incorrect data. Likewise, if a request completes with an error and a subsequent request completes successfully, the data returned from the subsequent request is used in data recovery operations. If all requests have returned an error, for example in an embodiment using two data paths, both the first and second requests complete with an error, then a failure is indicated within the system since potentially two or more drives within the drive array have failed.

Therefore, a disk controller system and method which maintains minimum data delivery requirements during varying types of conditions is shown and described. The disk controller launches a plurality of data requests for the same data along different data paths. Thus, if one or more of the requests fails, the other requests being performed contemporaneously will soon complete or will have completed returning the correct data. This guarantees that the correct data is returned even in instances where one or more of the data paths returns incorrect data. In addition, data recovery operations can be performed much more quickly and efficiently on a failed drive since the correct data returned from one of the data paths is readily available for these operations.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Computer System Block Diagram

Figure 1:
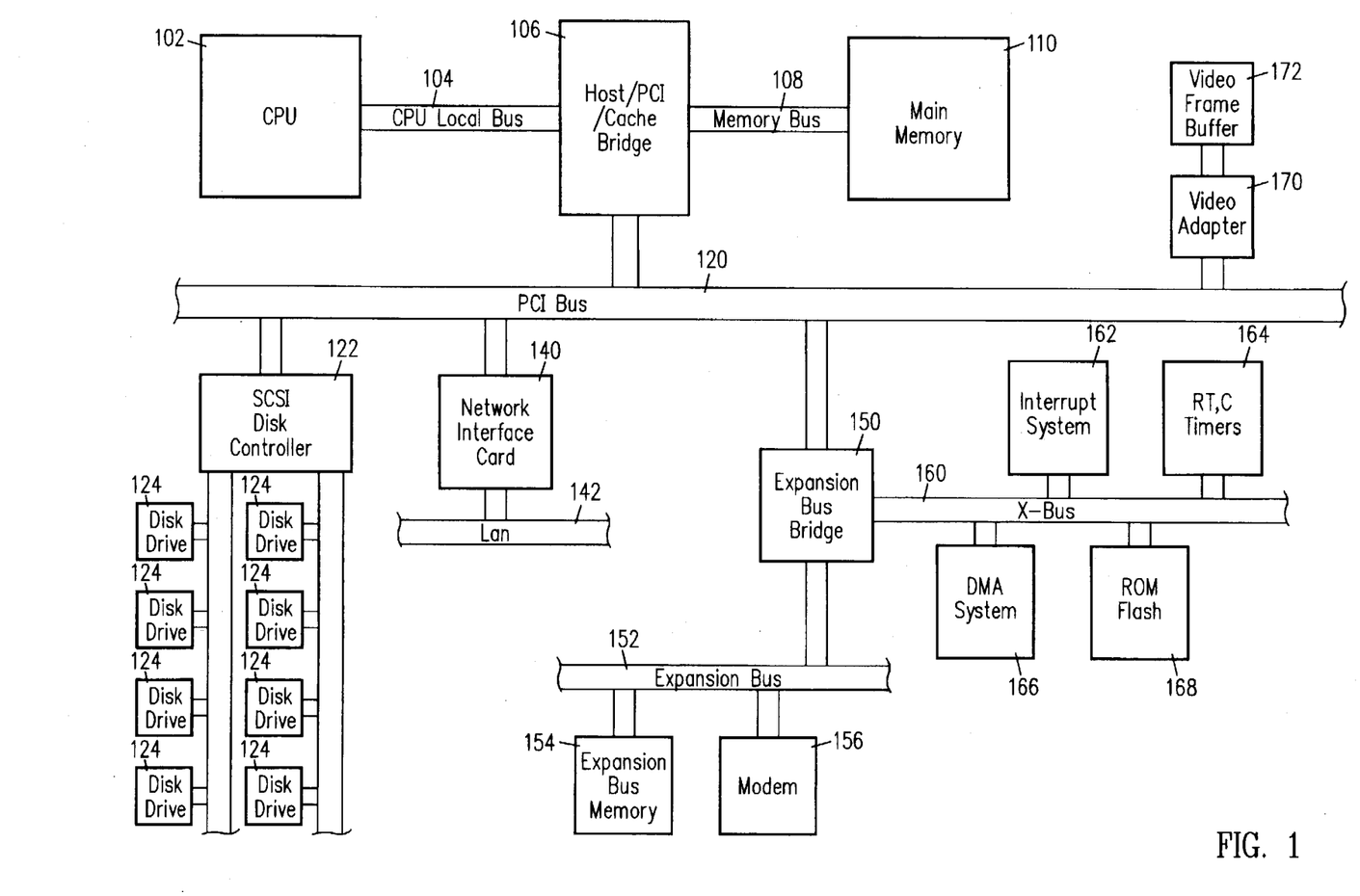
FIG. 1 is a block diagram of a computer system incorporating a disk array system of the present invention.

Referring now to FIG. 1, a block diagram of a computer system incorporating a disk subsystem and including the preferred embodiment of the present invention is shown. It is noted that the present invention may be incorporated into any of various types of computer systems. As shown, the computer system includes a central processing unit (CPU) 102 which is coupled through a CPU local bus 104 to a host/PCI/cache bridge 106. The bridge 106 couples through a memory bus 108 to main memory 110. The host/PCI/cache bridge 106 also interfaces to a peripheral component interconnect (PCI) bus 120. In the preferred embodiment, a PCI local bus is used. However, it is noted that other local buses may be used, such as the VESA (Video Electronics Standards Association) VL bus.

Figure 2:
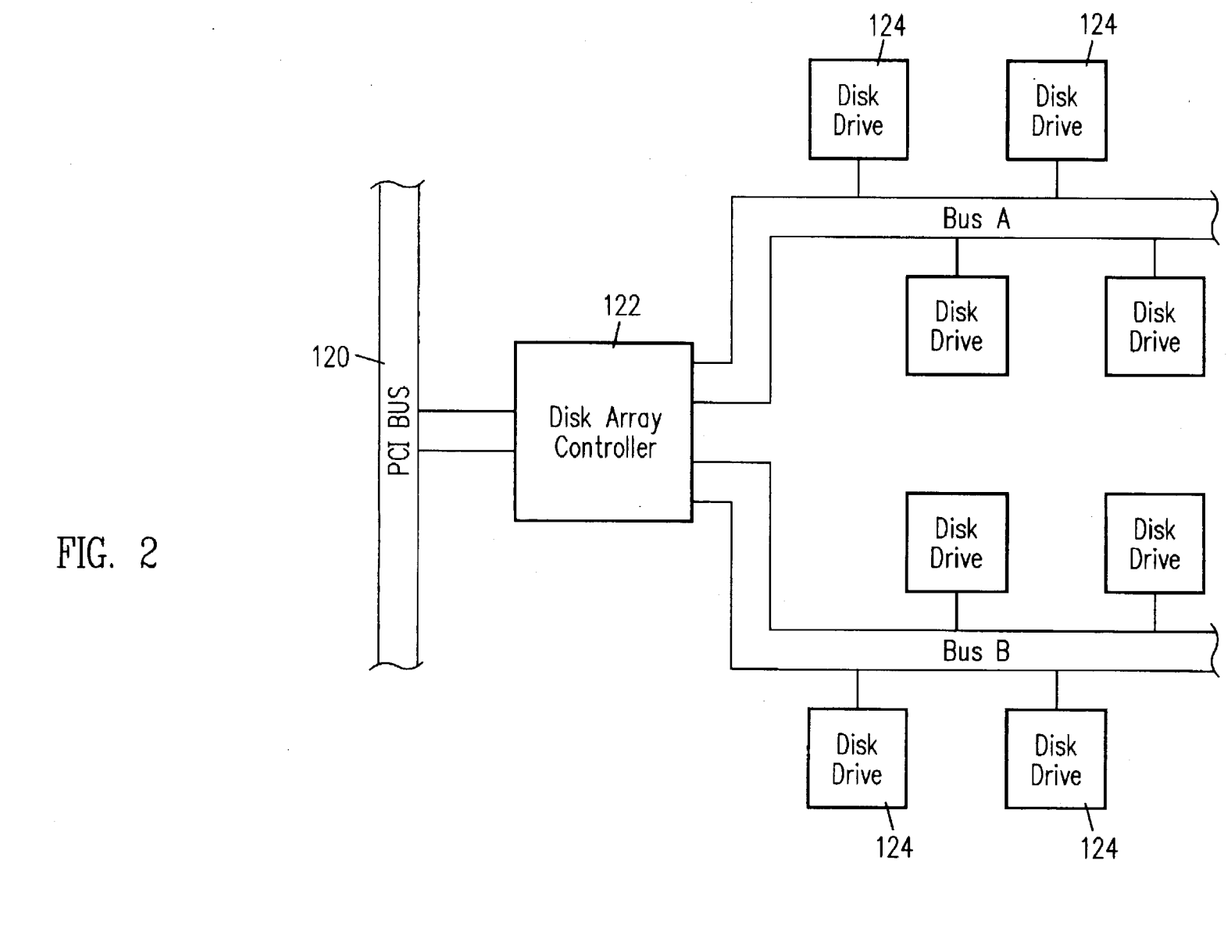
FIG. 2 illustrates the disk array system shown in FIG. 1.

Various types of devices may be connected to the PCI bus 120. In the embodiment shown in FIG. 1, a video adapter 170 and video frame buffer 172 are coupled to the PCI bus 120 for controlling video functions. A disk controller 122 is coupled to the PCI bus 120. In the preferred embodiment, the disk controller 122 is a SCSI (small computer systems interface) disk controller. In the embodiment shown, the SCSI disk controller 122 includes two SCSI channels 123 and 125. Each of these SCSI channels 123 and 125 includes four disk drive units 124 forming a disk array. The disk array system is shown separately in FIG. 2. Various other devices may be connected to the PCI bus 120, such as a network interface card 140. As shown, the network interface card 140 interfaces to a local area network (LAN) 142.

Expansion bus bridge logic 150 is also preferably coupled to the PCI bus 120. The expansion bus bridge logic 150 interfaces to an expansion bus 152. The expansion bus may be any of varying types, including the industry standard architecture (ISA) bus, also referred to as the AT bus, the extended industry standard architecture (EISA) bus, or the microchannel architecture (MCA) bus. Various devices may be coupled to the expansion bus 152, including expansion bus memory 154 and a modem 156. The expansion bus bridge logic 150 also couples to a peripheral expansion bus referred to as the X-bus 160. The X-bus 160 is used for connecting various peripherals to the computer system. As shown, an interrupt system 162, a real time clock (RTC) and timers 164, a direct memory access (DMA) system 166, and ROM/Flash memory 168 are coupled to the X-bus 160. Other peripherals (not shown) are preferably connected to the X-bus 160, including communications ports, diagnostics ports, command/status registers, non-volatile static random access memory (NVSRAM), etc.

Disk Controller Block Diagram

Figure 3:
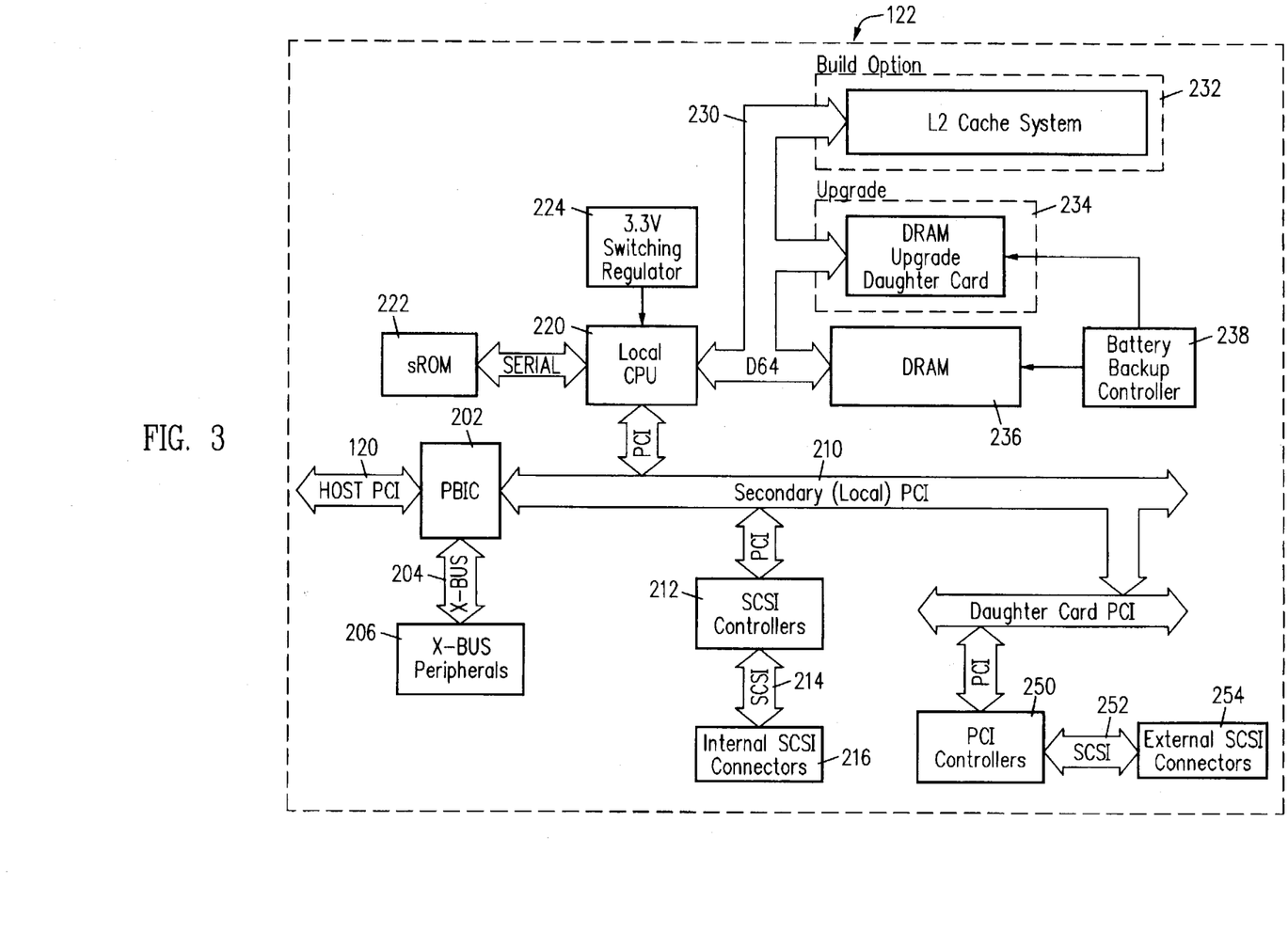
FIG. 3 is a block diagram illustrating the disk controller of FIGS. 1 and 2.

Referring now to FIG. 3, a block diagram illustrating the SCSI adapter 122 in FIG. 1 is shown. As shown, the SCSI adapter 122 includes a PCI bus interface chip (PBIC) 202, which couples to the host or primary PCI bus 120. The PBIC 202 interfaces through a second X-bus 204 to various X-bus peripherals 206 as shown. The various X-bus peripherals 206 preferably include a DMA system, interrupt system, timers, a real time clock (RTC). configuration ports, diagnostic ports, command/status registers, ROM/Flash memory, and non-volatile SRAM (NVSRAM) (all not shown).

The PBIC 202 also couples to a secondary PCI bus 210. SCSI controllers 212 are coupled to the secondary PCI bus 210. The SCSI controllers 212 in turn couple through a SCSI bus 214 to internal SCSI connectors 216. In the preferred embodiment, two SCSI controllers are incorporated into block 212, and the SCSI bus 214 comprises the two SCSI channels 123 and 125. The internal SCSI connectors 216 are for attaching the various devices, such as the disk drives 124, as shown in FIG. 1.

A local CPU 220 is coupled to the secondary PCI bus 210. The local CPU 220 may be any of various types. In the preferred embodiment, the local CPU 220 is the PowerPC microprocessor produced by Motorola and IBM. In an alternate embodiment, the local CPU 220 is the Alpha chip from Digital Equipment Corporation (DEC). The local CPU 220 couples through a serial bus to an SROM 222. The local CPU 220 receives power from a 3.3V switching regulator 224, as shown. The local CPU 220 includes a 64 bit data path which couples through a 64-bit data bus 230. Dynamic random access memory (DRAM) 236 is coupled to the 64-bit data bus 230. The local CPU 220 executes software in the DRAM 236 to perform read operations on the disk array while maintaining a minimum quality of service according to the present invention, as discussed below.

The 64-bit data bus 230 also includes a connection for coupling to an optional dynamic random access memory (DRAM) upgrade daughter card 234. An optional second level or L2 cache system 232 may also be coupled to the 64-bit data bus 230. The DRAM upgrade daughter card 234 and the L2 cache system 232 are shown in dotted lines and are options that are included in the preferred embodiment, but may be left out as desired. A battery backup controller 238 is coupled to each of the DRAM 236 and the DRAM upgrade daughter card 234. The local PCI bus 210 also includes a daughter card option for additional SCSI connections. As shown, additional PCI controllers 250 may be coupled to the local PCI bus 210 through a daughter card PCI bus as shown. The PCI controllers 250 couple through additional SCSI channels 252 to respective external SCSI connectors 254, as shown.

Flowchart Diagram—Minimum Quality of Service

Figure 4A:
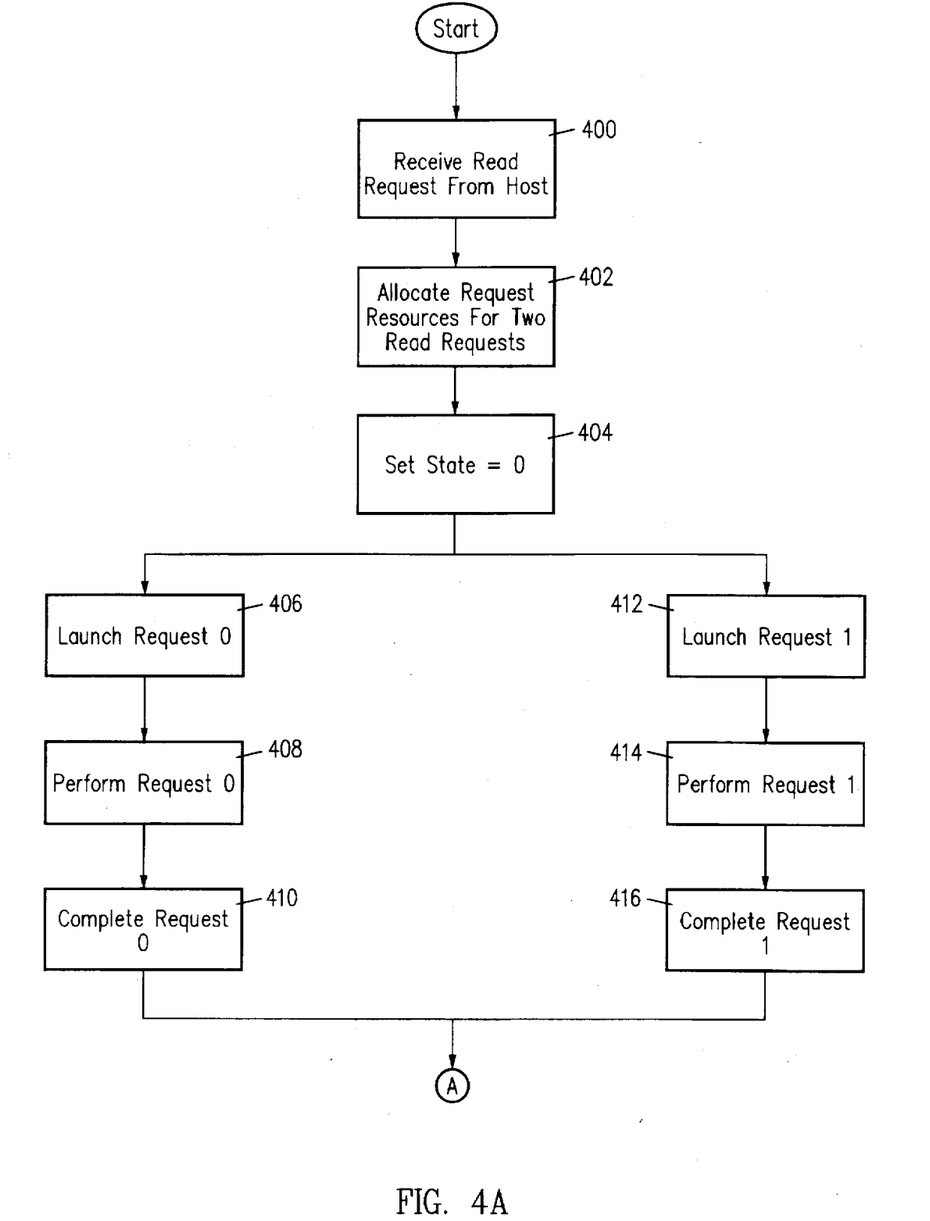
FIGS. 4A and 4B are flowchart diagrams illustrating operation of the disk controller performing read operations and maintaining a minimum quality of service according to the present invention.
Figure 4B:
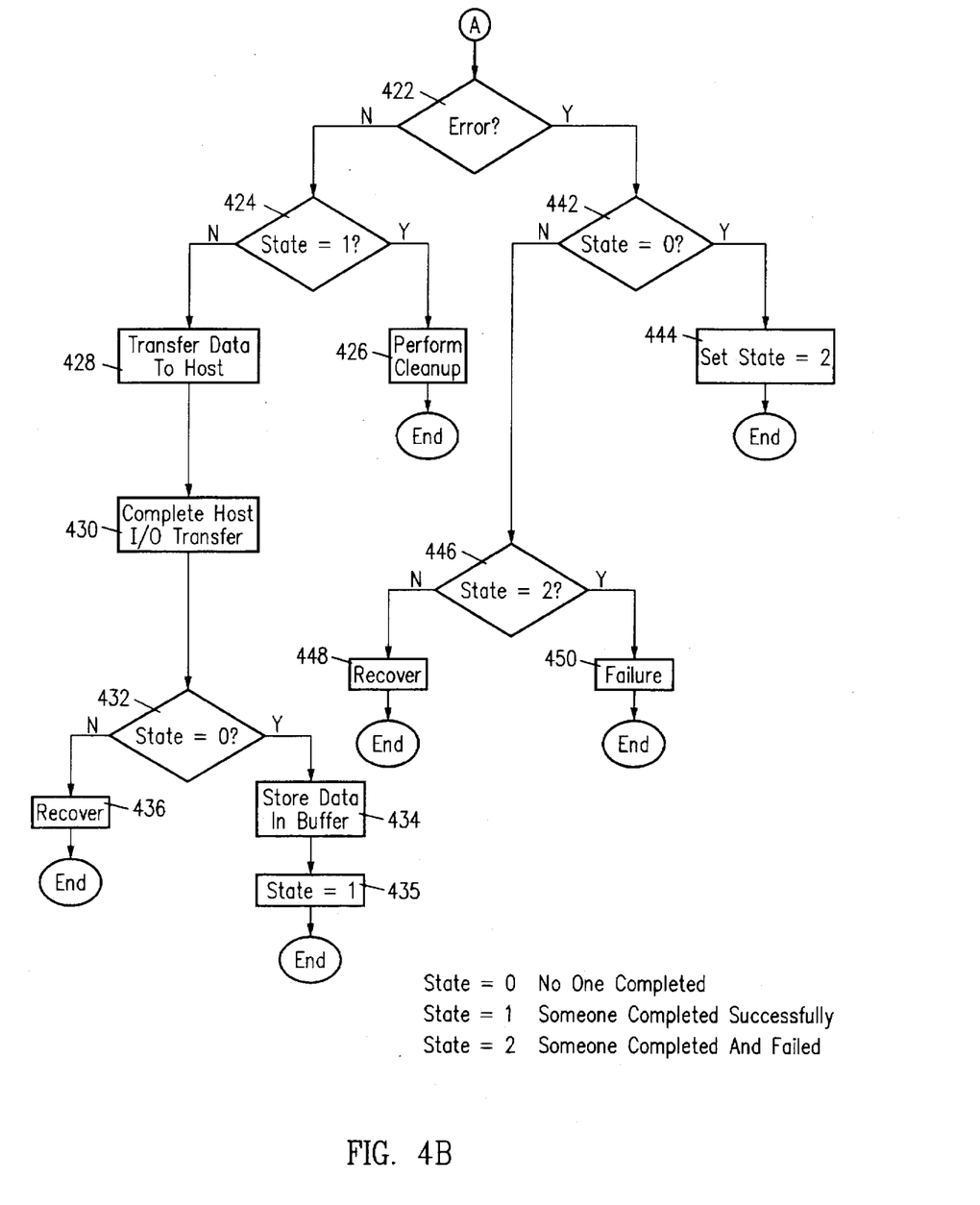

Referring now to FIGS. 4A and 4B, a flowchart diagram illustrating performance of read requests across a plurality of alternate data paths to achieve a minimum quality of service or minimum data transfer rate is shown. The preferred embodiment shown in FIG. 4 issues two requests across two different data paths to the disk drives 124 in the disk array to obtain the same requested data. However, it is noted that the present invention may be generalized to include issuance of any of a plurality of requests using any of a plurality of data paths. The preferred embodiment shown in FIGS. 4A and 4B uses a state flag which is set to 0 to indicate that no request has completed, is set to 1 to indicate a request has completed successfully, and is set to 2 to indicate a request has completed and failed.

In step 400 the disk controller 122 receives a read request from the host such as the host CPU 102. In step 402 the disk controller 122 allocates request resources for two different read requests on two differing data paths referred to as request 0 and request 1. As noted above, the disk controller 122 can allocate requests for a plurality, i.e., two or more, of read requests on a plurality of data paths as desired. In step 404 the disk controller sets the state flag equal to zero. When the state flag is set equal to zero, this indicates that neither of the read requests has completed. The disk controller 122 then launches request 0 and request 1 in steps 406 and 412, respectively. In step 408 request 0 is performed and in step 414 request 1 is performed. It is noted that request 0 and request 1 are performed substantially simultaneously on alternate data paths to the disk drives 124 to obtain the requested data. In general, the requests will require differing amounts of time to complete and thus one of the requests will generally complete before the other. When either of the two requests complete, i.e., when either of request 0 completes in step 410 or request 1 completes in step 416, then the disk controller 122 begins operating in step 422, as shown in FIG. 4B. As noted below, different operations are performed below for each completing request depending on whether a prior request has completed and whether the prior request returned correct or erroneous data.

As shown in FIG. 4B, when one of either request 0 or request 1 completes, then in step 422 the disk controller 122 determines if the data returned by the completed request is in error. In other words, the disk controller 122 uses the parity or redundancy data returned with the requested data to determine if the data is in error. If not, then in step 424 the disk controller 122 determines if the state flag is equal to one. As discussed above, the state flag is initially set to zero in step 404. The state flag is set equal to one to indicate that one of the requests has completed successfully. If the state flag is set equal to one in step 424 then in step 426 the disk controller 122 performs normal clean-up operations. In this case, since the state flag indicates that one of the requests has already completed successfully and the second request also completed without an error, then both request 0 and request 1 have completed successfully. Thus, normal clean-up operations are performed in step 426 to deallocate the resources, and operation completes.

If the disk controller determines that the state flag is not set equal to one in step 424, then the current request which has completed is the first request to complete successfully. In this instance, in step 428 the disk controller 122 transfers the returned data to the host requester, typically the host CPU 102. In step 430 the disk controller 122 completes the host I/O transfer. In step 432 the disk controller 122 determines if the state flag is equal to zero, i.e., the disk controller 122 again determines if this is the first request to have completed successfully. If yes, then in step 434 the disk controller 122 stores the correct data in a buffer for later possible use in case the second request to complete returns incorrect data and hence recovery operations are required. The buffer is preferably a memory space in the DRAM 236. In step 435 the disk controller 122 sets the state flag equal to one to indicate that a request has successfully completed, and operation completes.

If the state flag is not equal to zero in step 432, then the state flag equals two, indicating that a prior request has completed and failed, i.e., returned invalid data. In this instance, in step 436 the disk controller 122 performs recovery operations on the failed request. The recovery operations use the current data returned by the successfully completed request. The recovery operations performed by the disk controller 122 according to the present invention are discussed further below with regard to the flowchart of FIG. 5. After performing the necessary recovery operations in step 436, operation then completes.

If the disk controller determines in step 422 that the completed request returned invalid or erroneous data in step 422, then the disk controller 122 advances to 442. In step 442 the disk controller 122 determines if the state flag is set to zero. If so, then a request has not yet completed and the current request being processed is the first request to complete. In this instance, the disk controller 122 sets the state flag equal to two in step 444 to indicate that a request has completed and failed, and operation completes. If the state flag is not equal to zero in step 442, then in step 446 the disk controller 122 determines if the state flag is equal to two. If no, then the state flag must be set equal to one, indicating that a prior request has completed successfully. In this case, the disk controller 122 advances to step 448 to perform recovery operations on the incorrect returned data from the second completed request. The recovery operations use the correct data returned from the earlier successfully completed request and stored in the buffer in step 434. As mentioned above, the recovery operations performed by the disk controller 122 according to the present invention are discussed with reference to FIG. 5.

If the disk controller 122 determines that the state flag is equal to two in step 446, then a prior request has completed and failed and the current request has also completed and failed. This indicates that the requests on both alternate data paths have returned incorrect data, indicating a failure of one or more of the drives within the system. In this case, in step 450 the host transaction is completed with a bad status indicating a failure of the drive array, and operation completes.

Flowchart Diagram—Recovery Operations

Figure 5:
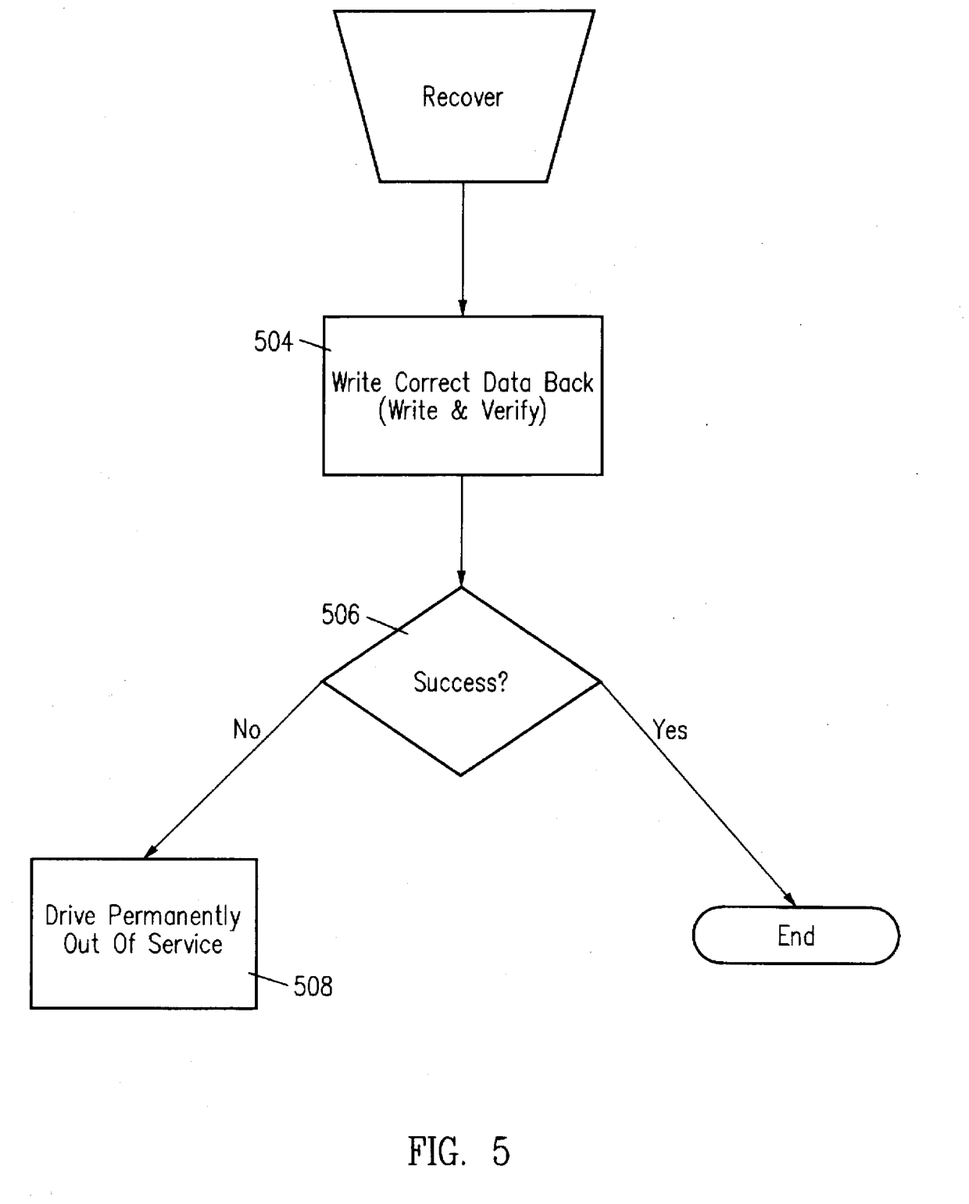
FIG. 5 illustrates a data recovery operation when one of the data paths returns incorrect data.

Referring now to FIG. 5, a flowchart diagram illustrating recovery operations performed by the disk controller 122 when one of the requests fails and returns incorrect data is shown. It is noted that since multiple requests were launched to the same data along different data paths, one request will generally complete successfully, and the correct data is maintained in a data buffer until all requests have completed. Thus, when incorrect data is returned from one data path, the correct data obtained from another data path is readily available to be written back to the failed drive to recover the drive. This significantly increases the performance of recovery operations and thus helps maintain a minimum quality of service for real time applications which require minimum data delivery requirements.

In step 504 the disk controller 122 writes the correct data to the failed disk drive 124 preferably using a write plus verify operation. This involves a write of the correct data immediately followed by a read to ensure that the correct data has been written to the array. In step 506 the disk controller 122 determines if the correct data has been written successfully to the drive 124. If yes, then the recovery operation completes. If the disk drive 124 still returns incorrect data, then in step 508 the disk drive 124 is permanently removed from service, and one or more status lights or warning beeps are provided to a system administrator, indicating that the drive 124 should be replaced with a new drive.

Conclusion

Therefore, the disk controller 122 implements a method according to the present invention to maintain a minimum quality of service. As discussed above, a minimum quality of service is highly desired for real time applications which require minimum data delivery requirements. The disk controller 122 of the present invention receives a host read request and launches two or more requests for the same data using different data paths to the disk drives 124. These read requests are performed substantially in parallel, and thus the first request that completes successfully returns the requested data to the host CPU 102. Thus, if one of the requests fails, system performance is not adversely affected since one or more other requests have been issued for the same data at approximately the same time as the failed request, and one of these other requests should complete successfully. In addition, the first request which completes successfully does not release its internal data buffer, but maintains the requested data in its internal data buffer until all other requests on other data paths have completed. Accordingly, if a subsequent request completes and returns incorrect data, the correct data maintained within the data buffer from the successfully completed request is used to quickly recover the correct data on the erroneous drive. Thus, recovery operations on drives which return incorrect data can be performed much more quickly since the correct data is already present within a data buffer of the disk controller 122.

As discussed above, prior art methods load balance read requests across the data paths to deliver increased read performance. In other words, prior art systems initiate requests along different data paths for different data to increase I/O throughput. However, if one of the requests fails and/or returns incorrect data, then this request must be relaunched along a different data path. This could significantly affect data delivery and could produce a data delivery rate that is less than the minimum quality of service. This is unacceptable in real time applications which require a minimum rate of delivery. The present invention solves this problem and maintains a minimum quality of service under varying conditions.

Thus, the present invention achieves minimum data delivery rate during both normal and degraded conditions as well as during the transition between these conditions when a disk failure occurs and a request returns incorrect data. If the first request which completes returns erroneous data, the second request which was begun in parallel with the first for the same data completes much more quickly than if the second request was issued for different data than the first request. Therefore, since multiple requests are launched contemporaneously along different data paths for the same data, the failure of one drive will generally not affect the performance and minimum data delivery requirements of the disk array system since it is presumed that one data path will return correct data.

Although the method and apparatus of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A method for maintaining a minimum quality of service in a disk system comprising a disk array including a plurality of disk drives and a disk controller coupled to the disk array, the method comprising the steps of:

receiving a data read request from a host, wherein said data read request requests data from one or more disk drives in the disk array;

launching a plurality of read requests on the disk array to read said requested data, wherein each of said plurality of read requests uses a different data path to obtain said requested data;

a first read request completing on a first data path, wherein said first completed read request returns first data;

determining if said first data is in error; and transferring said first data to said host if said first data is not in error, wherein said step of transferring is performed only if a read request other than said first read request has not completed successfully prior to said first read request completing.

2. The method of claim 1, wherein said step of transferring is not performed if said first data is determined to be in error or a read request other than said first read request completed successfully prior to said first read request completing.

3. The method of claim 1, further comprising the step of:

determining if a read request other than said first read request completed successfully prior to said first read request completing, wherein said step of determining if a read request other than said first read request completed successfully prior to said first read request completing is performed after said first read request completes.

4. The method of claim 3, wherein said steps of said first read request completing, determining if said first data is in error, determining if a read request other than said first read request completed successfully prior to said first read request completing, and transferring said first data to said host if said first data is determined to not be in error and a read request other than said first read request did not complete successfully prior to said first read request completing are performed for each of said plurality of read requests launched in said step of launching.

5. A method for maintaining a minimum quality of service in a disk system comprising a disk array including a plurality of disk drives and a disk controller coupled to the disk array, the method comprising the steps of:

receiving a data read request from a host, wherein said data read request requests data from one or more disk drives in the disk array;

launching a plurality of read requests on the disk array to read said requested data, wherein each of said plurality of read requests uses a different data path to obtain said requested data;

a first read request completing on a first data path, wherein said first completed read request returns first data;

determining if said first data is in error, wherein said first data is determined to be correct data;

transferring said first data to said host if said first data is not in error;

maintaining said first data in a buffer until all of said plurality of read requests complete on said plurality of data paths;

a second read request completing after said first read request completes, wherein said second read request returns second data, wherein said second data is in error; and performing recovery operations on said second read request using said first data stored in said buffer.

6. A method for maintaining a minimum quality of service in a disk system comprising a disk array including a plurality of disk drives and a disk controller coupled to the disk array, the method comprising the steps of:

receiving a data read request from a host, wherein said data read request requests data from one or more disk drives in the disk array;

launching a plurality of read requests on the disk array to read said requested data, wherein each of said plurality of read requests uses a different data path to obtain said requested data, wherein said plurality of read requests comprise only two read requests, said two read requests comprising a first read request and a second read request;

said first read request completing on a first data path, wherein said first completed read request returns first data;

determining if said first data is in error;

transferring said first data to said host if said first data is not in error;

said second read request completing successfully and returning second data prior to said first read request completing;

determining if said second data is in error after said second read request completes, wherein said second data is determined to be correct data;

transferring said second data to said host if said second data is not in error; and performing clean up operations after said first read request completes if said first data is not in error.

7. A method for maintaining a minimum quality of service in a disk system comprising a disk array including a plurality of disk drives and a disk controller coupled to the disk array, the method comprising the steps of:

receiving a data read request from a host, wherein said data read request requests data from one or more disk drives in the disk array;

launching a plurality of read requests on the disk array to read said requested data, wherein each of said plurality of read requests uses a different data path to obtain said requested data, wherein said plurality of read requests comprise only two read requests, said two read requests comprising a first read request and a second read request;

said first read request completing on a first data path, wherein said first completed read request returns first data;

determining if said first data is in error;

transferring said first data to said host if said first data is not in error;

setting a completion flag indicating said first read request completed successfully if said first data is not in error and said second read request did not complete successfully prior to said first read request completing, wherein said step of setting said completion flag is performed after said step of transferring said first data to said host;

setting said completion flag to indicate said first read request failed if said first data is determined to be in error and said second read request did not complete successfully prior to said first read request completing;

said second read request completing after said first read request completes; and determining if said first read request completed successfully prior to said second read request completing, wherein said step of determining if said first read request completed successfully prior to said second read request completing is performed after said second read request completes, wherein said step of determining if said first read request completed successfully prior to said second read request completing comprises examining said completion flag.

8. A method for maintaining a minimum quality of service in a disk system comprising a disk array including a plurality of disk drives and a disk controller coupled to the disk array, the method comprising the steps of:

receiving a data read request from a host, wherein said data read request requests data from one or more disk drives in the disk array;

launching a plurality of read requests on the disk array to read said data, wherein each of said plurality of read requests uses a different data path to obtain said data, wherein said plurality of read requests includes a first read request using a first data path and a second read request using a second data path;

performing said first and second read requests substantially in parallel after said step of launching;

said first read request completing on said first data path, wherein said first completed read request returns first data;

determining if said first data is in error;

determining if said second read request has completed successfully prior to said first read request completing, wherein said step of determining if said second read request has completed successfully is performed after said first read request completes; and transferring said first data to said host if said first data is not in error and said second read request did not complete successfully prior to said first read request completing, wherein said step of transferring said first data is not performed if said first data is determined to be in error or said second read request completed successfully prior to said first read request completing.

9. The method of claim 8 wherein said first data is in error, the method further comprising the steps of:

said second read request completing successfully, wherein said second read request returns second data;

performing recovery operations on said first read request if said first data is determined to be in error and said second read request completes successfully, wherein said recovery operations use said second data returned from said second read request.

10. The method of claim 9, wherein said step of performing recovery operations is performed immediately after said first data is determined to be in error if said second read request completes successfully prior to said first read request completing.

11. The method of claim 9, wherein said step of performing recovery operations is performed immediately after said second read request completes successfully if said first data is determined to be in error and said second read request completes successfully after said first read request completes.

12. The method of claim 8, further comprising the step of: maintaining said first data in a buffer until said second read request completes.

13. The method of claim 8, further comprising the steps of:

said second read request completing on said second data path, wherein said second completed read request returns second data;

determining if said second data is in error;

determining if said first read request completed successfully prior to said second read request completing, wherein said step of determining if said first read request completed successfully prior to said second read request completing is performed after said second read request completes;

transferring said second data to said host if said second data is not in error and said first read request did not complete successfully prior to said second read request completing, wherein said step of transferring said second data is not performed if said second data is determined to be in error or said first read request completed successfully prior to said second read request completing.

14. The method of claim 13, further comprising the step of:

setting a completion flag indicating whether said first read request completed successfully after said step of determining if said first data is in error;

wherein said step of determining if said first read request has already completed successfully comprises examining said completion flag.

15. A disk drive array system which maintains a minimum quality of service during read operations, comprising:

a disk drive array comprising a plurality of disk drives and having a redundant configuration, wherein data can be accessed from said disk drive array using different ones of a plurality of data paths; and a disk controller coupled to said disk array, said disk controller comprising:

means for receiving a read request from a host to obtain data;

means for launching a plurality of read requests on said disk drive array to obtain requested data, wherein said plurality of read requests includes a first read request on a first data path and a second read request on a second data path;

means for determining if data returned from said first read request is in error;

means for determining if said second read request completed successfully prior to said first read request completing;

means for transferring said first data to said host if said first data is not in error and said second read request did not complete successfully prior to said first read request completing, wherein said means for transferring does not operate if said first data is determined to be in error or said second read request completed successfully prior to said first read request completing.

16. The disk drive array system of claim 15 further comprising:

a buffer for storing said data returned from said first read request, wherein said first data is stored in said buffer until said second read request completes on said second data path.

17. The disk drive array system of claim 16, further comprising:

means for performing recovery operations on said first read request if said first data is determined to be in error and said second read request completes successfully, wherein said recovery operations use said data returned from said completed second read request.

* * * * *